Figure 1:
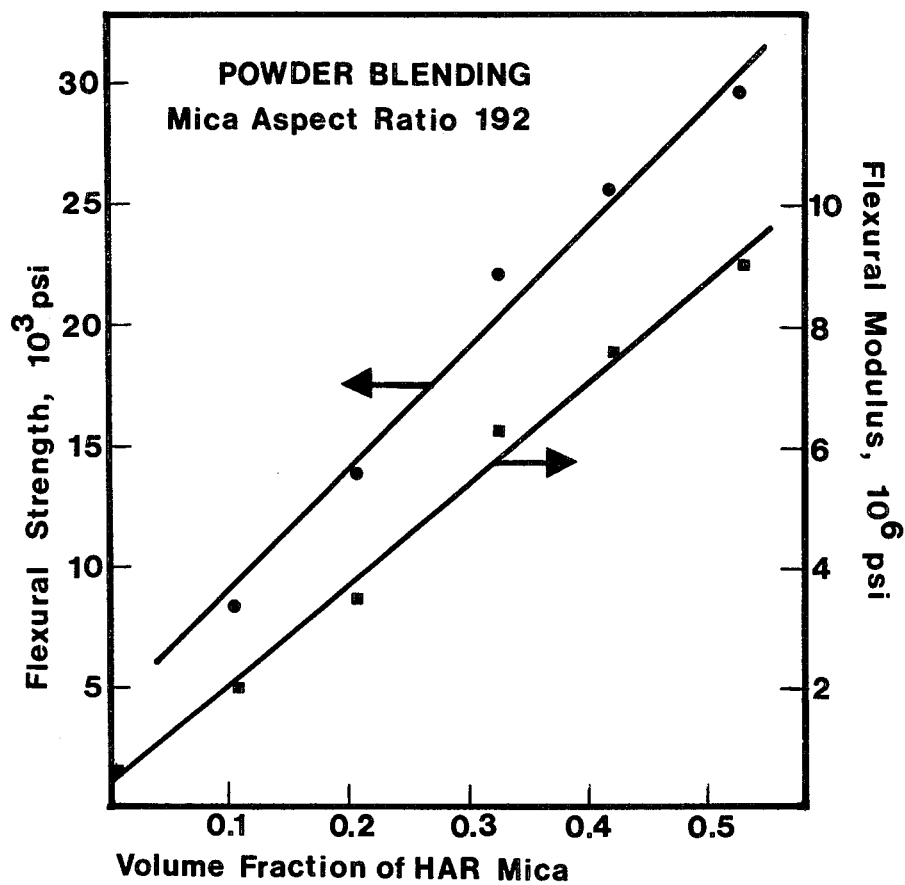

United States Patent [19]

Woodhams et al.

[11] 4,112,036
[45] Sep. 5, 1978

[54] PREPARING MICA-REINFORCED COMPOSITES

[75] Inventors: Raymond T. Woodhams, Toronto; Marinos Xanthos, Montreal, both of Canada

[73] Assignee: Canadian Patents and Development Limited, Ottawa, Canada

[21] Appl. No.: 691,632

[22] Filed: Jun. 1, 1976

Related U.S. Application Data

[63] Continuation-in-part of Ser. No. 486,972, Jul. 10, 1974, abandoned.

[51] Int. Cl.² ............................................... B05B 3/00
[52] U.S. Cl. ..................................... 264/28; 264/110; 264/115; 264/122
[58] Field of Search ............... 264/110, 115, 121, 122, 264/28, DIG. 51

[56] References Cited

U.S. PATENT DOCUMENTS 3,764,456  10/1973  Woodhams ..................... 161/171

Primary Examiner—Robert F. White
Assistant Examiner—James R. Hall
Attorney, Agent, or Firm—Alan A. Thomson

[57] ABSTRACT

Molding compounds in various forms for molding into high performance composites, are prepared from reinforcing mica platelets, preferably of high aspect ratio, and thermosetting unsaturated polyester resins. The unsaturated polyester solid and a solid vinylic monomer are blended, finely divided (e.g. to about −200 mesh), and the platelets are uniformly coated with these fine particles by dry blending. A compaction with partial coalescence of the fine resin particles in situ is carried out to densify and aggregate the coated platelets and shape the mixture. The resulting molding powders, bulk or sheet molding compounds are readily molded into the high performance composites, the platelets being substantially protected from degradation by the distributed resin.

11 Claims, 2 Drawing Figures

PREPARING MICA-REINFORCED COMPOSITES

This application is a continuation-in-part of Ser. No. 486,972 filed July 10, 1974 now abandoned.

This invention deals with the compounding of reinforcing mica flake with polyester resin to form molding compounds in the form of granules, sheet molding compounds etc.

BACKGROUND AND INTRODUCTION

In U.S. Pat. No. 3,764,456, Oct. 9, 1973, Woodhams, a new composition of matter was described comprising a thermoplastic or thermosetting polymer and a proportion of high aspect ratio mica flakes, the term "high aspect ratio" denoting flakes having an average diameter to thickness ratio greater than 30. Such composites when molded in such a manner as to preserve the high aspect ratios of the mica flakes, exhibit higher strengths and stiffnesses when compared to mica composites having flakes with aspect ratios below 30. The composites exhibited unusually high flexural modulus values, usually above $7 \times 10^6$ psi at high volume loadings of mica and with a strong dependence of the modulus and strength on the flake aspect ratio (the ratio of the average flake diameter to thickness). Flexural strengths between 25,000 and 35,000 psi were possible at mica volume fractions of 0.5. Despite these attractive values of modulus and strength, flake reinforcement has not found many applications for two main reasons. The first is that high aspect ratio (HAR) flakes are extremely delicate and cannot easily be compounded and molded without destroying most of their reinforcing properties. Secondly the mica composites exhibit poor impact strength values, usually below 1.0 ft.lb./inch of notch on the Izod scale. Previously mica had usually found moderate use as a cheap filler but not as an outstanding reinforcing agent.

The prior art, particularly U.S. Pat. No. 3,764,456, describes a number of techniques for blending together a polymeric resin and mica flakes. It was shown in this patent that a uniform distribution or encapsulation of mica by the polymeric resin required a liquid resin system and could be accomplished for example by mixing together a polymer latex and the HAR mica flakes, followed by coprecipitation. The coprecipitation and subsequent coupling was aided if the polymer contained polar or ionic groups such as carboxylic substituents or tertiary amine substituents. The use of a finely divided polymeric material in the form of a latex (liquid) permitted a relatively complete and uniform distribution of the polymer surrounding each and every flake. Such a uniform distribution is important in order to avoid the formation of flaws, voids or weak areas and subsequent inferior physical properties after molding. Such uniformity of mixing and initial distribution of polymer over the surface of the flakes is far more critical than in the case of fibers. The use of a latex liquid or a polymer solution to precoat mica flakes has limited application in the plastics industry.

In the case of reconstituted mica sheets, methods have been described for impregnating such sheets with liquid resins, sometimes with the aid of a solvent to reduce the viscosity of the resin. Similar methods have been employed in our own studies with HAR mica with satisfactory results insofar as the properties of the resulting molded composite are concerned. However, this method is difficult and time consuming so that it is unattractive for large scale commercial manufacture. Many blending and molding techniques utilized failed to yield the desired high performance molded composites for a number of reasons, but primarily because of degradation of the mica flake (significant decrease in aspect ratio). Other compounding and molding techniques which have given satisfactory results have been difficult, expensive or time consuming. Consequently ther is a need to provide a simpler and less costly means of introducing HAR mica into resin systems and particularly into a thermosetting polyester resin without mica aspect ratio degradation.

It is the purpose of this invention to provide a relatively simple and economical method for preparing molding powders, bulk or sheet molding compounds containing high aspect ratio mica (called HAR mica). The term "bulk molding compound" and "sheet molding compound" are common terms employed in the plastics industry and are frequently abbreviated to BMC and SMC respectively. Such compounds are important since they lend themselves to highly automated, mass production operations as well as custom molding in small businesses. The design of such molding compounds is becoming increasingly sophisticated due to the complexity of such mixtures which, in addition to the reinforcing agent, may contain antioxidants, heat stabilizers, viscosity controllers, mold release agents, low profile additives, catalysts, promoters, pigments, ultraviolet stabilizers, coupling agents, toughening agents, etc. Such compounds are readily available commercially in the case of glass fibers. This application describes a method for preparing HAR mica-containing granules, pellets, sheet and bulk molding compounds using an unsaturated polyester resin blend.

Figure 2:
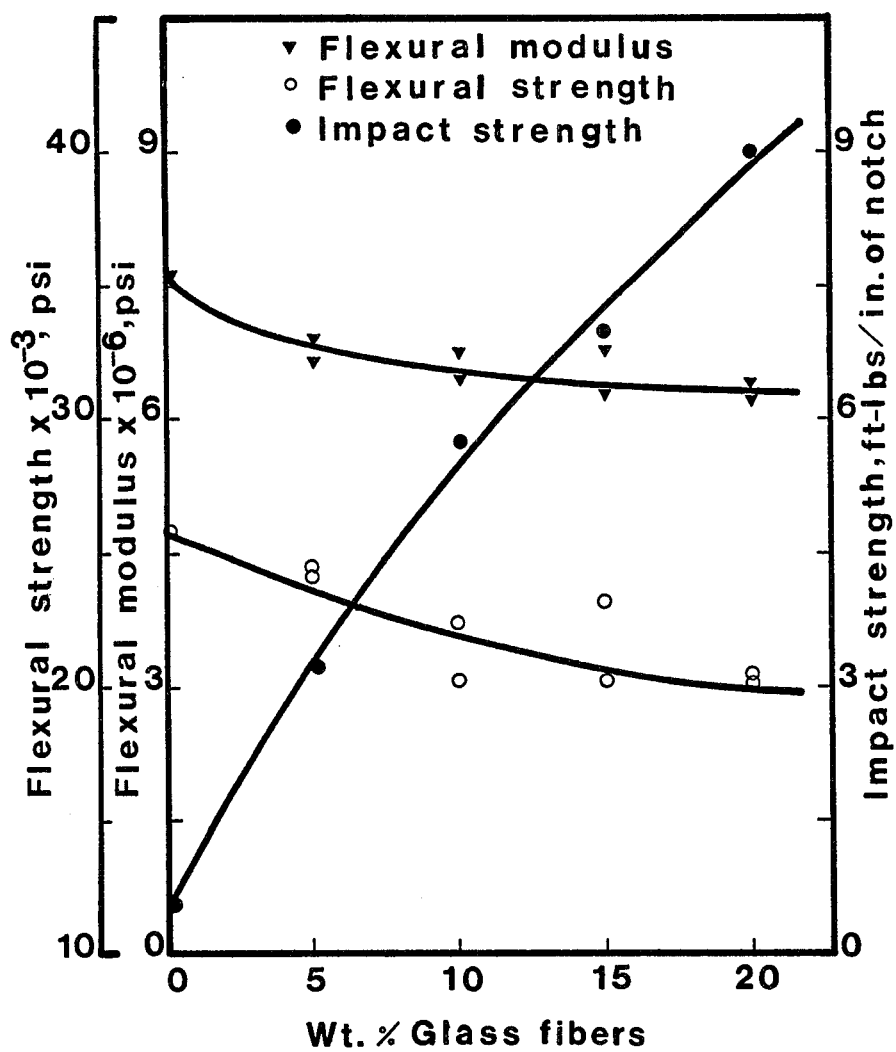

In the accompanying drawings FIG. 1 is a graph showing the effect of mica volume fraction on the flexural modulus and flexural strength of composites prepared by this invention at different mica volume loadings. FIG. 2 is a graph showing the effect of chopped glass roving on the properties of the mica-reinforced composites.

Reinforcement of thermosetting polyester resins is of special interest, and an advantageous method has now been found for incorporating mica flakes into certain polyester resin systems for reinforcement.

The class generally known as polyester resins is very broad and comprises a large number of polyesters and monomers in various proportions. Normally a polyester resin contains a proportion of an unsaturated polyester (usually about 70% by weight) and a vinylic monomer such as styrene (usually about 30% by weight). Such resins are widely used in industry because of their outstanding physical and chemical properties at an attractive price. Attempts to mix HAR mica with such liquid resins leads to extensive HAR flake degradation and consequent reduction in the average aspect ratio. In fact, any fairly intensive mixing process giving a uniform composition will lead to extensive HAR flake degradation and therefore special methods are needed to accomplish thorough mixing and wetting without damage to the flakes so that the outstanding reinforcement could be realized.

The following test will illustrate the effect of a conventional mixing method such as the cone vertical mixer or sigma blade mixer on HAR mica flake degradation. Phlogopite mica flakes having a narrow aspect ratio distribution were chosen for this test which had an average aspect ratio of $172 \pm 5$ ($-40 + 70$ mesh size).

Two samples were mixed in a cone vertical mixer (50/50 and 75/25 mica/polyester resin weight ratios) with a general purpose viscous liquid polyester resin (Polylite 31000, (trademark) Reichhold Chemicals Inc.) until a complete dispersion and wetting had been achieved. Magnesium oxide (5 phr) was used as a thickening agent. After mixing, the viscous mixture was compacted between rollers and sandwiched between polyethylene film until the thickening reaction was complete, usually requiring a period of 3 days at room temperature. Molded specimens prepared from these sheet compounds gave flexural moduli in the range of $4-5 \times 10^6$ psi and flexural strengths of 12,000–17,000 psi which were independent of mica content, viz. the 50% by weight mica samples gave nearly the same results as the 75% by weight mica sample. These values are well below the values which may be obtained by following the method outlined in this application. In the case of the 75% by weight sample, values of $9 \times 10^6$ psi flexural modulus and 30,000 psi flexural strength were reproducibly attained by following the method described herein. Screen analyses were carried out during the mixing period to assess the extent of flake degradation in the above test. After 10 minutes of mixing, a screen analysis gave the following mesh size distribution (initially 100% −40 + 70 mesh).

| AFTER 10 MIN. IN MIXER | | |
| --- | --- | --- |
| U.S. Standard Mesh Size | | Mica Flake Weight Percent Retained |
| −40 | +70 | 45 |
| −70 | +100 | 17 |
| −100 | +140 | 16 |
| −140 | +200 | 18 |
|  | −200 | 4 |

PRESENT INVENTION

It has now been found that reinforcing mica flakes can be safely and conveniently mixed with very finely divided polyester polymeric powders without noticeable flake degradation provided the relative particle sizes are controlled. In particular, it has been found important that the powdered resin particles be substantially smaller than the diameters of the flakes so that the desired uniform coverage of the flakes with the powder is possible. The optimum size of the powdered resin will depend on the average flake diameter utilized. Resin particles selected within the 300 to 1 micron diameter range with mica platelets selected within the 2000 to 10 micron diameter range have given good results where the bulk of the resin was less than one fifth of the diameter of the average mica platelet diameter. Alternatively, the average platelet diameter should be at least about 5 times the average resin blend particle diameter, preferably about 10 times.

For mica flakes having average diameters greater than 300 microns and thicknesses between 1 and 5 microns, the following resin particle size distributions have been found satisfactory for (a) a magnesium oxide (MgO) thickened polyester resin and (b) a polyester resin thickened with diphenyl methane diisocyanate (MDI).

| RESIN PARTICLE SIZE DISTRIBUTION | | |
| --- | --- | --- |
| Resin Particle Diameter (microns) | Percent by Weight of MgO Thickened Resin | Percent by Weight of MDI Thickened Resin |
| greater than 250 | 15.8 | 18 |
| 250 to 149 | 9.5 | 10 |
| 149 to 74 | 20.6 | 28 |
| less than 74 | 54.1 | 44 |

Both of the resin powders shown have a major weight fraction of particles which are much less than the diameters of the mica flakes. Electrostatic attraction, facilitated by prolonged tumbling or fluidized bed treatment, ensured the complete encapsulation of the mica flakes with a layer of resin particles. If the particles are very large, then the resin cannot properly protect the flakes and distribute during the molding operation, and the resulting composites are extremely weak and friable, and in some cases they cannot be mounted for testing. It should be noted that the use of polyester resin systems containing styrene did not permit the preparation of powders with such small diameters, apparently due to the particles fusing together.

Unsaturated polyester resins are not readily available in powder form. While it is possible to gel thermosetting liquid polyester systems with finely divided fillers, such as the fumed silicas, clays or other high oil-absorption fillers, the resultant product, when finely divided, has a tendency to form lumps, lose monomer by evaporation, and yield rather poor composites. In general, rather large quantities of the fumed silica or filler must be employed to gel such liquid resins. In the method of the present invention, the volatile liquid monomer in the polyester resin is replaced by a solid, non-volatile monomer, permitting the preparation of fine free-flowing thermosetting polyester resin powders which are relatively stable and non-volatile at ambient temperatures.

In accordance with the invention, molding compounds for molding mica-reinforced thermosetting polyester resin composites are prepared by steps comprising: (a) mixing a solid curable unsaturated polyester, in the presence of a chain-extending agent for the polyester with a solid vinylic monomer, in melt or solution form to provide an intimate blend thereof, (b) solidifying by one of cooling the melt and removing solvent from the solution, and subdividing this blend to a particle size of less than about 250 microns diameter, (c) mixing the resulting blend particles with reinforcing mica platelets both as dry powders, at least about 50 wt % of the particles having diameters less than about one fifth of the average diameter of the platelets, said mixing being sufficient to effect intimate dispersion and coating of the platelets with the particles, (d) heating the particle-coated platelets sufficiently to soften and partially coalesce the particles, and (e) shaping and cooling the hot partially-coalesced material to form molding compounds selected from the group consisting of granules and sheet molding compounds wherein the mica platelets are uniformly distributed without degradation.

The granules, pellets, bulk and sheet molding compounds are then carefully molded into final form, preferably avoiding high localized stresses which would degrade the flake aspect ratio. Molding and thermosetting would be carried out within the temperature range of about 80° to 250° C.

Suitable cross-linking solid vinylic monomers may include substituted acrylamides such as diacetone acrylamide, methylene bisacrylamide, diacetone acrylamide/formaldehyde condensation products (e.g. DAATS resin), N-tert-butyl acrylamide, ethylene dimethacrylate or allyl monomers such as triallyl cyanurate and triallyl isocyanurate.

It is generally desirable to melt and mix together the unsaturated polyester, monomer, and other additives into a blend prior to size reduction by e.g. atomization or mechanical grinding. Forming a solution of polyester and solid monomer in a mutual solvent and removing the solvent is also operative. During comminution or grinding, care must be taken to avoid an increase in temperature leading to softening or sticking together of the particles. Grinding is facilitated at low temperatures (usually below about 0° C, preferably below −20° C) where the resin is in a brittle form, and any decomposition of the initiator is prevented.

The viscosity of the polyester resin at the molding temperature is of major importance when preparing high performance composites. If the resin viscosity is too low, then extrusion of the resin away from the platelets can occur during molding under pressure so that the remaining mica in resin-poor areas is not properly bonded. If the resin viscosity is too high, the resin does not flow and fuse together properly leaving many voids and giving a weak friable composite. Consequently, an important feature of this invention is the control of viscosity at the molding temperature by the use of chain-extending reagents such as metal oxides or polyisocyanates. Other chain-extending agents may include difunctional or polyfunctional epoxy, amine and aziridine compounds. Chain extension with metal oxides has been described in the literature. The use of isocyanates as chain-extending agents is widely used in the polyurethane industry, and their reaction with unsaturated polyesters has also been reported. Such chain extending agents interact with reactive functional groups contained in the polyester prepolymer, either as end groups or attached near the ends of the polyester chain.

The polyester prepolymers may be linear or branched before chain extension. Such polyester prepolymers may be produced by esterifying unsaturated and saturated dicarboxylic acids or anhydrides with a bifunctional or polyfunctional alcohol. As examples of possible unsaturated acids may be mentioned maleic acid, fumaric acid, itaconic acid and chlorendic acid. Examples of possible saturated acids are adipic acid, sebacic acid, succinic, phthalic acid, isophthalic acid whereas alcohols may include ethylene glycol, propylene glycol, diethylene glycol, glycerol and pentaerythritol. In the case of metal oxides or hydroxides such as magnesium oxide, zinc oxide or hydroxide, and calcium oxide or hydroxide, the preferred reactive end groups are carboxylic. In the case of isocyanate thickeners, hydroxyl end groups are preferred although amine, mercaptan, or carboxyl groups may also be used. Such chain extension of the unsaturated polyester resin component increases the viscosity and permits a uniform flow of the mica reinforced compound under normal processing temperatures (120°-150° C.) and pressures (100 - 5000 psi) without the formation of resin-rich areas or "bleeding".

The use of such a chain-extended polyester in combination with a solid monomer permits the preparation of a fine-particle size storage-stable power in which an optional or minimal amount of anticaking agent may be added.

In addition to these requirements—particle size, viscosity and low volatility—the resin system must be capable of long storage at ambient temperatures without polymerization or cross linking, but readily undergo such polymerization and crosslinking at the curing temperature. The metal oxide chain-extended polyesters were found to be more storage-stable (compared to diisocyanate). Organic peroxides which decompose at elevated temperatures are usually chosen for initiating the polymerization, for example, benzoyl peroxide, di-tert-butyl peroxide, tert-butyl-perbenzoate, dicumyl peroxide and 2,5-dimethylhexyl-2,5-di(peroxybenzoate). Mixtures of initiators are sometimes selected with the intention of reducing the peak exotherm or the time for a complete cure.

After chain extension with metal oxide or a polyisocyanate, the polyester may be blended with the monomer and other customary additives. The "other" additives include (i) a mold release agent such as zinc stearate, (ii) additional polymerization inhibitor such as hydroquinone, hydroquinone monomethylether, tertiary butylcatechol, or butylated hydroxyanisole, (iii) an anti-caking agent such as fumed silica, and (iv) a silane coupling agent, when good interfacial bonding and good retention of wet flexural strength are desirable. The latter may be added directly into the polyester resin during mixing or applied onto the surface of the mica flakes directly or from solution prior to blending with the resin powder. In addition, it is often advantageous to include a proportion of chopped reinforcing fibers with the HAR mica in order to impart improved impact strength and toughness to the molded composite. Such reinforcing fibers may be selected from glass, graphite, boron or aromatic polyamide for example. Up to about 20% by volume or about 40% by weight of the composite may be such fibers. The dry solids have been found to intermix and handle very well. The addition of chopped glass fibers was shown to impart notched Izod impact strength values as high as 9 ft.-lbs./inch without significant reduction of the modulus and strength.

The mica flakes may be tumble mixed or pneumatically or otherwise dry blended with the powdered resin in proportions of from about 5–80% by weight of the blend. Fluidized bed mixing is operative. Usually at least about 10% of mica is added, the mica platelets preferably having an average aspect ratio of 50-200. Chopped fibers may be also mixed at this stage. After powder blending, the bulk density is usually quite low, an undesirable feature in most molding operations. A bulk density above 1 gm./cc. is usually desirable in the form of non-dusting granules about 0.12-0.25 inches diameter. A short heating period (up to 3 minutes) while the material is still agitated is usually sufficient to densify and compact or coalesce the powdered mixture into a granular solid free from fines. This dry blending and coalescence may be carried out consecutively in a fluidized bed (see Example 5). The dry mixing can take place in the fluidized bed by separately feeding the resin particles and mica to the bed. The granular solid molding compound may be used directly for bulk molding or may be directly formed or calendered into sheets. Densification, coalescence or calendering temperatures are chosen to be well below the decomposition temperature of the organic peroxide used as initiator, but sufficient for softening and coalescence of the powdered resin to occur. Preferable temperatures are usually 60°-100° C., but depend on the softening point of the particular resin system being used.

Typical concentrations by weight of the different ingredients in the powdered polyester resin may be as follows: chain-extended unsaturated polyester 50–85%; solid crosslinking momomer 50–15%; inhibitor 0.01–0.1% based on the weight of the unsaturated polyester and monomer; free-radical initiator 0.1–2% based on the weight of polyester and monomer; fumed silica 1–10% and zinc stearate 1–5% based on the above total.

The following examples illustrate the preparation of such unsaturated polyester resin powders and their use in HAR mica reinforced composites.

EXAMPLE 1

An unsaturated flame retardant polyester (100 g., Hetron 26949, (trademark) Hooker Chemical Co.) was dissolved in methylene chloride (50 g.). To this solution was added hydroquinone (0.14 g.) in acetone (2 g.), diacetone acrylamide (43 g.) and t-butyl perbenzoate (1.4 g.), followed by finely divided magnesium oxide (Michigan 1782 Magnesia) (5 g.) after complete solution had been reached. The resulting dispersion was heated at 35° C. for two days until the mixture had formed a hard gel. The methylene chloride solvent was then partly removed under vacuum and the gelled mixture ground to a fine powder in the presence of solid carbon dioxide using a CRC Micro-Mill (The Chemical Rubber Co.). After grinding, the last remaining traces of solvent were removed. The resulting powder of screen size −140 mesh (U.S. Standard, −105 microns) was mixed with finely divided silica (5 g., Silanox, (trademark) Cabot Corporation) and zinc stearate (5 g.). The bulk density of the final powder was 0.58 g./cm$^3$.

This polyester resin powder (40 g.) was mixed with phlogopite mica −20 + 40 mesh (60 g.), having an average diameter of 470 microns and aspect ratio of 192, using a rotating drum over a period of one hour. The powder mixture was then compacted into a coherent sheet at 70° C. for 2 minutes between two sheets of polyethylene in a press. The resulting sheet material was subsequently compression molded at 140° C. and 500 psi for 3 minutes into a rectangular bar 3 × 1 × 0.1 inches. The average flexural values from several test specimens were 25.6 × 10$^3$ psi flexural strength, 7.6 × 10$^6$ psi flexural modulus, and the ASTM notched Izod test gave 0.6 ft.-lb./inch of notch. The mica flakes were sieved before and after compression molding and the sieve analysis indicated no measurable decrease in the flake diameters and consequently no reduction in aspect ratio. Very uniform coating of the mica by the resin particles and protection during compaction and molding was achieved.

Polyester resin powder of higher bulk density and larger particle size (1–1.5 g./cm.$^3$ and −60 + 100 mesh), was also blended with the HAR mica and compacted into a coherent sheet as above. Compression molded specimens exhibited poor physical properties. Optical inspection of the composite indicated poor dispersion of the mica flakes and the presence of resin rich areas as a result of the non-ideal mixing of the flakes with the relatively large-particle-size resin. From several similar experiments it was concluded that the particle size of the powdered resin was a critical factor in the optimization of the physical and mechanical properties of HAR mica composites prepared by powder blending.

It was found that the resin must be more finely divided than the mica in order to ensure complete encapsulation of each mica flake with resin leading to a coherent, completely-bonded mass after molding and curing. Best properties have been realized when the diameter of the resin particles is of the same order as the thickness of the platelets.

EXAMPLE 2

An unsaturated fire retardant polyester (Hooker Chemical Hetron 26949) (100 g.) was melted in a cone vertical mixer (Atlantic Research Model 4CV) and 2,4-tolylene diisocyanate (5 g.) was added with continuous mixing over a period of 1 hour at 110° C., in a nitrogen atmosphere. The mixing was continued while diacetone acrylamide (25 g.), hydroquinone (0.1 g.) and dicumylperoxide (1.5 g.) were added at 80° C. The molten mixture was allowed to cool and subsequently ground to a fine powder in a high speed mill (CRC Micro-Mill) in the presence of dry ice. Sixty g. of the resulting powder of particle size −140 mesh were blended with 40 g. of phlogopite mica (average diameter 470 microns, aspect ratio 192) and formed into a sheet as described in Example 1. The sheet compound was molded at 150° C. and 1000 psi for 5 minutes. Thicker specimens required a correspondingly longer molding period. Average flexural modulus and strength values were 7.4 × 10$^6$ psi and 25 × 10$^3$ psi respectively. Uniform distribution and protection of the mica flakes were evidently achieved.

EXAMPLE 3

A propoxylated bisphenol A-fumarate polyester (Atlas, Atlac 382 (trademark), 100 g.) and diacetone acrylamide/formaldehyde condensation product (DAATS resin, the Lubrizol Corporation, 41 g.) were dissolved in methylene chloride (50 g.) to form a clear solution. Hydroquinone (0.14 g. in 2 ml. acetone), t-butyl perbenzoate (1.4 g.) and finely divided magnesium oxide (5 g., Michigan 1782 Magnesia) were added to the solution and the resulting suspension allowed to gel over a period of 3 days at 35° C. The solvent was removed under vacuum and the resulting solid ground to a fine powder as in Example 1. Phlogopite mica (−40 + 70 mesh, 70 g., aspect ratio 172) was dry-mixed with the above prepared polyester resin powder (30 g.) of particle size −140 mesh and compression molded into a rectangular test bar. The compound showed good flow characteristics and after molding at 140° C. for 5 minutes, yielded an average flexural modulus of 8.90 × 10$^6$ psi and an average flexural strength of 30 × 10$^3$ psi on five specimens. These results indicated good distribution of the mica without significant aspect ratio degradation was achieved.

EXAMPLE 4

An unsaturated fire retardant polyester (Hooker Hetron 26949, 100 g.) was dissolved in methylene chloride (50 g.) and diphenylmethane-4,4'-diisocyanate added to the solution. The reaction was catalysed by the addition of stannous octoate (0.25 g.). After completion of the thickening reaction (about 4 hours at room temperature) diacetone acrylamide (41 g.), hydroquinone (0.14 g.) and t-butylperbenzoate (1.4 g.) were added in a solution of methylene chloride (20 g.). The solution was then evaporated to a solid and cryogenically ground to a fine powder in a high speed grinding mill (CRC micro-mill). Fumed silica (5 g., Cabot Corporation Cab-O-Sil) and zinc stearate (5 g.) were added during the grinding. 40 parts of the prepared polyester resin powder of particle size −140 mesh were dry blended with 60 parts of phlogopite mica (Laviolette Mining and Metallurgical Co., Suzorite grade, average diameter 316 microns, aspect ratio 172) and sheeted through heated rollers at 75° C. The sheet molding compound thus prepared was stable for several months at room temperature. The sheet flowed readily at molding temperatures and did not show any phase separation. When molded at 140° for 5 minutes, the physical testing results gave a flexural modulus of $7.5 \times 10^6$ psi and a flexural strength of 25,000 psi. The ASTM Izod Impact Strength (notched) was 0.7 ft.-lb./inch.

EXAMPLE 5

This example describes the preparation of a densified mica-polyester resin powder mixture suitable for compression, transfer molding, or thermoset injection molding.

An unsaturated polyester resin powder (40 parts) prepared according to Example 1 was dry mixed with the phlogopite mica of aspect ratio 192 (60 parts) and suspended in a column by a stream of air. Hot air was introduced into the fluidized suspension for 30 seconds causing an almost immediate coalescence of the resin and mica particles into a dense, coarse powder without fines. The coalesced powder particle size was about 2 mm. and the resin uniformly surrounded the mica flakes in each pellet. The densified material was stored for one month and subsequently molded at 140° C. and 1000 psi pressure. Molded composites had a flexural modulus of $7 \times 10^6$ psi and a flexural strength of $23 \times 10^3$ psi.

EXAMPLE 6

This example illustrates the use of chopped glass fibers in admixture with mica to impart additional impact strength.

Phlogopite mica of aspect ratio 192 (50 g.), ½-inch chopped glass roving (10 g.), and an unsaturated polyester resin powder of particle size −140 mesh (40 g.) as prepared in Example 1 were dry mixed and calendered into a sheet using warm rolls. The sheet molding compound was compression molded for 5 minutes at 140° and 500 psi pressure into rectangular test bars. The molded bars yielded a flexural modulus of $6.7 \times 10^6$ psi, flexural strength $22 \times 10^3$ psi and notched Izod Impact Strength of 5.7 ft.-lbs./inch. The corresponding molded bar without glass fibers had a notched Izod Impact Strength of 0.6 ft.-lbs./inch.

Powdeer blending according to the invention offers distinct advantages over liquid mixing or vacuum impregnation techniques, namely retention of high aspect ratio and ease of compounding at high mica volume loadings respectively. However, when employed for the preparation of polyester resin bulk or sheet molding compounds, special resin systems needed to be developed. The use of solid cross-linking monomers in conjunction with chain extended unsaturated polyesters resulted in a satisfactory system which combined proper melt viscosity at processing temperatures with good storage stability at room temperature. Fast curing rates, good flow characterstics and reproducible physical properties, were obtained using the above compounding procedures. The low impact strength of HAR mica composites have been overcome by the addition of reinforcing fibers e.g. chopped glass rovings. Cationic silane coupling agents may also be used to advantage to improve the long term moisture resistance of such composites.

EXAMPLE 7

HAR mica flakes were prepared by the ultrasonic delamination of crude phlogopite mica (Suzorite type) −10 +20 mesh (Laviolette Mining and Metallurgical Co.). The flakes were then classified according to aspect ratio, (defined here as the average diameter to thickness ratio) by combined water elutriation and sieving. The aspect ratio of the collected fractions ranged from 152 to 267.

In several experiments the mica flakes were precoated with 0.15 weight percent silane coupling agent from a 95/5 methanol/water solution at pH 4.8–6.4 adjusted with acetic acid. Silane coupling agents evaluated includes A-174 (Union Carbide), Z-6031 and XZ-8-5069 (Dow Corning). The solvent was removed under vacuum in a rotating evaporator. Mica flakes treated in this manner did not have a tendency to stick together. A post-treatment at 120° C. for 30 minutes removed the last traces of solvent, and completed the silane fixation to the surface.

Free-flowing, finely divided unsaturated polyester resins were prepared by chain-extension of a solid unsaturated alkyd resin in melt or solution with alkaline earth oxides or hydroxides or difunctional isocyanates. After the addition of inhibitor (hydroquinone), high-temperature initiator (t-butyl perbenzoate) and mold release agent (zinc stearate), the resin was mixed with diacetone acrylamide. After evaporation of the solvent under vacuum, the mixture was cryogenically ground to a fine powder and a small amount of anticaking agent, (fumed silica), was added. The resulting free-flowing powder was stable for several weeks at room temperature without coalescence or lump formation. Two typical formulations used in this example are shown in Table I.

TABLE I

Powdered Polyester Resin Formulations

| | Parts | |
|---|---|---|
| Hetron 26949 (Hooker Chem. Co.) polyester | 100.00 | 100.00 |
| Diacetone acrylamide | 42.86 | 42.86 |
| Hydroquinone | 0.14 | 0.14 |
| t-butyl perbenzoate | 1.40 | 1.40 |
| Magnesium oxide | 5.00 | — |
| Diphenylmethane-4,4'-diisocyanate | — | 7.50 |
| Stannous octoate | — | 0.25 |
| Zinc stearate | 5.00 | 5.00 |
| Silanox (trademark,Cabot Co.) - silica | 7.70 | 7.70 |

Polyester resin powder (Table I) was mixed with HAR phlogopite mica using a rotating drum over a period of 1 hour. The powder mixture was then pressed between two sheets of polyethylene into a coherent sheet at 70° C. for 2 minutes. (The dry powder mixture may also be calendered into a sheet using warm rolls). The sheets or dense particles produced were stable for a long time before molding.

The sheet molding compounds were compression molded into test specimens at 140° C. and 500–1000 psi. Curing cycles were usually 3–5 minutes depending on the thickness of the test specimen. Flexural properties and impact strength were measured according to ASTM D790 and D256 respectively. FIG. 1 shows the excellent flexural properties obtained. The simplicity of the method, and the good properties achieved should make the present method attractive.

Impact strengths of mica composites are normally low (0.5–1.0 ft.-lbs./in. of notch). The addition of chopped glass fibers (5–10%) resulted in a marked improvement in the impact strength without serious concomitant loss of flexural strength and modulus. FIG. 2 shows the effect of adding various amounts of ½ inch chopped strand on the flexural properties and the impact strength of composites prepared by this powder blending. The composites contained 60 wt. % of mica plus glass fibers combined in each case. Addition of 10% by weight glass fibers resulted in notched Izod impact values of 5.5 ft.-lbs./in. as opposed to 0.6 ft.-lbs./in. for composites without added glass fibers. Table II summarizes the properties of HAR mica/polyester and HAR mica/glass fiber/polyester composites prepared by this powder blending approach.

Coalescence Control

The controlled partial coalescence of the very fine, uniformly distributed resin powder and the reinforcing mica flakes is dependent upon the softening point of the resin and the time of heat treatment. At elevated temperatures, say 20°–40° C. above the resin softening point, the fluidized bed treatment for effecting partial coalescence can be relatively short, e.g. about 15 to 50 seconds. Of course, no coalescence will take place below the softening point of the resin. For a polyester resin system having a softening point of about 60° C., a conventional hot air blower was quite sufficient for effecting the coalescence in fluidizing air. The treatment time should be kept as short as possible to minimize possible crosslinking. For partial coalescence with pressing, temperatures closer to the softening point of the resin could be used (say up to 20° C. above the softening point), with pressing for about 1–3 minutes being adequate. Thus both the time and temperature of treatment must be carefully controlled in order to permit adequate coalescence around and between the platelets without producing excessive crosslinking. Irreversible crosslinking and hardening prevents the required flow and densification, without distorting or fracturing the mica platelets, required for molding the highly reinforced polyester composites.

TABLE II

Properties of HAR Mica/Polyester and HAR Mica/Glass Fiber/Polyester Composites (Powder Blending)

| | HAR Mica*/Resin+ 60/40 | HAR Mica*/GF**/Resin+ 50/10/40 |
|---|---|---|
| Density (g/cm$^3$) | 2.01 | 1.98 |
| Flexular modulus, psi × 10$^6$ | 7.65 | 6.75 |
| (GN/m$^2$) | (52.74) | (46.54) |
| Flexural strength, psi × 10$^3$ | 26.50 | 22.00 |
| (MN/m$^2$) | (182.71) | (151.69) |
| Izod impact notched, ft.-lbs./in. | 0.6 | 5.4 |
| Hardness, Barcol | 58 – 62 | 58 – 62 |
| Volume Resistivity, Ohm-cm. (ASTM D257) | 1.3 × 10$^{15}$ | — |
| Surface Resistivity, Ohm (ASTM D257) | 8.4 × 10$^{13}$ | — |

*Ultrasonically delaminated −10 +20 mesh Phlogopite (Laviolette Mining and Metallurgical Co.), Aspect Ratio = 192.
+See Table I.
**½" Chopped Strand (Fiberglas Canada Ltd.).

We claim:

1. A method of preparing molding compounds for molding mica-reinforced thermosetting polyester resin composites, comprising:
   a. mixing a solid curable unsaturated polyester, in the presence of a chain-extending agent for the polyester with a solid vinylic monomer, said mixing taking place in liquid form to provide an intimate blend thereof, said chainextending agent being selected to control the viscosity of the molding compounds at molding temperatures,
   b. solidifying said liquid blend,
   c. subdividing said solidified blend as a dry powder of selected particle size within the range of 300 to 1 microns diameter,
   d. mixing the resulting dry blend particles with reinforcing mica platelets as a dry powder, at least about 50 wt. % of the blend particles having diameters less than about one fifth of the average diameter of the mica platelets, said mixing being sufficient to effect intimate dispersion and to coat the mica platelets with the blend particles,
   e. heating the blend particle-coated mica platelets to soften and partially coalesce the blend particles and to densify the mixture, without initiating cross-linking of said polyester,
   f. shaping said partially-coalesced blendcoated mica platelets into a desired form, and
   g. cooling said shaped coated platelets to form said molding compounds wherein said mica platelets are uniformly distributed with substantial retention of initial mica platelet aspect ratio.

2. The method of claim 1 wherein the mica platelet aspect ratio of average diameter/thickness is at least about 50.

3. The method of claim 1 wherein the solid vinylic monomer is selected from the group consisting of diacetone, acrylamide, methylene bisacrylamide, diacetone acrylamide/formaldehyde condensation products, N-tertbutylacrylamide, ethylene dimethylacrylate, and solid allyl monomers.

4. The method of claim 1 wherein reinforcing fibers are dry blended with the platelets and blend particles in step (d).

5. The method of claim 1 wherein in step (c) thereof the blend is subdivided by grinding at temperatures below ambient where the blend is brittle and grinding is facilitated and initiator decomposition is prevented.

6. The method of claim 5 wherein the grinding is carried out below about 0° C.

7. The method of claim 1 wherein the mica is present in amounts of about 10 to 80% wt.

8. The method of claim 1 where in steps (e) and (f), the particle-coated mica platelets are agitated while suspended in air at a temperature to cause said blend particles to partially coalesce and form into larger composite granules as molding compounds.

9. The method of claim 8 wherein the air suspension and partial coalescence are carried out in a fluidized bed.

10. The method of claim 1 wherein in step (f), said partially-coalesced blend-coated mica platelets are shaped into a sheet to form sheet molding compounds.

11. The method of claim 1 wherein the mica platelets are within 2000 to 10 microns diameter, and the average platelet diameter is at least about 5 times the average blend particle diameter.

* * * * *